(12) United States Patent
Al Majid et al.

(10) Patent No.: US 11,688,119 B2
(45) Date of Patent: *Jun. 27, 2023

(54) ANIMATED EXPRESSIVE ICON

(71) Applicant: Snap Inc., Santa Monica, CA (US)

(72) Inventors: Newar Husam Al Majid, New York, NY (US); Nathan Kenneth Boyd, Los Angeles, CA (US); Sheldon Chang, Venice, CA (US); Chamal Samaranayake, Venice, CA (US); Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,152

(22) Filed: Jul. 13, 2022

(65) Prior Publication Data

US 2022/0351453 A1    Nov. 3, 2022

Related U.S. Application Data

(63) Continuation of application No. 17/376,457, filed on Jul. 15, 2021, now Pat. No. 11,468,618, which is a
(Continued)

(51) Int. Cl.
*G06T 13/40* (2011.01)
*G06F 3/04817* (2022.01)
(Continued)

(52) U.S. Cl.
CPC .......... *G06T 13/40* (2013.01); *G06F 3/04817* (2013.01); *G06V 40/168* (2022.01); *H04L 67/306* (2013.01)

(58) Field of Classification Search
CPC ......... G06T 13/00; G06T 13/20; G06T 13/40; G06T 13/205; G06T 13/60; G06T 13/80;
(Continued)

(56) References Cited

U.S. PATENT DOCUMENTS 5,754,939 A    5/1998   Herz et al.
5,880,731 A    3/1999   Liles et al.
(Continued)

FOREIGN PATENT DOCUMENTS

CA     2887596 A1    7/2015
CN    109863532 A    6/2019
(Continued)

OTHER PUBLICATIONS

"U.S. Appl. No. 15/908,422, Examiner Interview Summary dated May 13, 2019", 4 pgs.
(Continued)

*Primary Examiner* — Abderrahim Merouan
(74) *Attorney, Agent, or Firm* — Schwegman Lundberg & Woessner, P.A.

(57) ABSTRACT

Embodiments described herein include an expressive icon system to present an animated graphical icon, wherein the animated graphical icon is generated by capture facial tracking data at a client device. In some embodiments, the system may track and capture facial tracking data of a user via a camera associated with a client device (e.g., a front facing camera, or a paired camera), and process the facial tracking data to animate a graphical icon.

17 Claims, 9 Drawing Sheets

Related U.S. Application Data continuation of application No. 16/946,463, filed on Jun. 23, 2020, now Pat. No. 11,120,601, which is a continuation of application No. 15/908,422, filed on Feb. 28, 2018, now Pat. No. 10,726,603.

(51) Int. Cl.
*H04L 67/306* (2022.01)
*G06V 40/16* (2022.01)

(58) Field of Classification Search
CPC ............ G06T 2213/00; G06T 2213/04; G06T 2213/12
See application file for complete search history.

(56) References Cited

U.S. PATENT DOCUMENTS

| | | |
|---|---|---|
| 6,023,270 A | 2/2000 | Brush, II et al. |
| 6,038,295 A | 3/2000 | Mattes |
| 6,158,044 A | 12/2000 | Tibbetts |
| 6,167,435 A | 12/2000 | Druckenmiller et al. |
| 6,205,432 B1 | 3/2001 | Gabbard et al. |
| 6,223,165 B1 | 4/2001 | Lauffer |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,772,195 B1 | 8/2004 | Hatlelid et al. |
| 6,842,779 B1 | 1/2005 | Nishizawa |
| 6,980,909 B2 | 12/2005 | Root et al. |
| 6,990,452 B1 | 1/2006 | Ostermann et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,342,587 B2 | 3/2008 | Danzig et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,468,729 B1 | 12/2008 | Levinson |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,636,755 B2 | 12/2009 | Blattner et al. |
| 7,639,251 B2 | 12/2009 | Gu et al. |
| 7,703,140 B2 | 4/2010 | Nath et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,912,896 B2 | 3/2011 | Wolovitz et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,131,597 B2 | 3/2012 | Hudetz |
| 8,146,005 B2 | 3/2012 | Jones et al. |
| 8,151,191 B2 | 4/2012 | Nicol |
| 8,170,957 B2 | 5/2012 | Richard |
| 8,199,747 B2 | 6/2012 | Rojas et al. |
| 8,212,821 B1 * | 7/2012 | Kopylov ............... G06T 13/80 345/473 |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,570,907 B2 | 10/2013 | Garcia, Jr. et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,745,132 B2 | 6/2014 | Obradovich |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,924,250 B2 | 12/2014 | Bates et al. |
| 8,963,926 B2 | 2/2015 | Brown et al. |
| 8,989,786 B2 | 3/2015 | Feghali |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,086,776 B2 | 7/2015 | Ye et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,241,184 B2 | 1/2016 | Weerasinghe |
| 9,256,860 B2 | 2/2016 | Herger et al. |
| 9,264,463 B2 | 2/2016 | Rubinstein et al. |
| 9,276,886 B1 | 3/2016 | Samaranayake |
| 9,294,425 B1 | 3/2016 | Son |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,385,983 B1 | 7/2016 | Sehn |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,443,227 B2 | 9/2016 | Evans et al. |
| 9,460,541 B2 | 10/2016 | Li et al. |
| 9,482,882 B1 | 11/2016 | Hanover et al. |
| 9,482,883 B1 | 11/2016 | Meisenholder |
| 9,489,661 B2 | 11/2016 | Evans et al. |

(56) References Cited

U.S. PATENT DOCUMENTS

| | | |
|---|---|---|
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,628,950 B1 | 4/2017 | Noeth et al. |
| 9,648,376 B2 | 5/2017 | Chang et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,785,796 B1 | 10/2017 | Murphy et al. |
| 9,792,714 B2 | 10/2017 | Li et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,726,603 B1 | 7/2020 | Al Majid et al. |
| 11,120,601 B2 | 9/2021 | Al Majid et al. |
| 2002/0047868 A1 | 4/2002 | Miyazawa |
| 2002/0067362 A1 | 6/2002 | Agostino Nocera et al. |
| 2002/0144154 A1 | 10/2002 | Tomkow |
| 2002/0169644 A1 | 11/2002 | Greene |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0162419 A1 | 7/2005 | Kim et al. |
| 2005/0020661 A1 | 9/2005 | Cordelli |
| 2005/0198128 A1 | 9/2005 | Anderson |
| 2005/0223066 A1 | 10/2005 | Buchheit et al. |
| 2005/0248574 A1 | 11/2005 | Ashtekar et al. |
| 2006/0242239 A1 | 10/2006 | Morishima et al. |
| 2006/0270419 A1 | 11/2006 | Crowley et al. |
| 2006/0294465 A1 | 12/2006 | Ronen et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0158222 A1 | 7/2008 | Li et al. |
| 2008/0163074 A1 | 7/2008 | Tu |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0016617 A1 | 1/2009 | Bregman-amitai et al. |
| 2009/0042588 A1 | 2/2009 | Lottin et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0132453 A1 | 5/2009 | Hangartner et al. |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0082427 A1 | 4/2010 | Burgener et al. |
| 2010/0115426 A1 | 5/2010 | Liu et al. |
| 2010/0131880 A1 | 5/2010 | Lee et al. |
| 2010/0162149 A1 | 6/2010 | Sheleheda et al. |
| 2010/0185665 A1 | 7/2010 | Horn et al. |
| 2010/0203968 A1 | 8/2010 | Gill et al. |
| 2010/0227682 A1 | 9/2010 | Reville et al. |
| 2010/0306669 A1 | 12/2010 | Della Pasqua |
| 2011/0007077 A1 | 1/2011 | Kamath et al. |
| 2011/0093780 A1 | 4/2011 | Dunn |
| 2011/0099507 A1 | 4/2011 | Nesladek et al. |
| 2011/0115798 A1 | 5/2011 | Nayar et al. |
| 2011/0145564 A1 | 6/2011 | Moshir et al. |
| 2011/0148864 A1 | 6/2011 | Lee et al. |
| 2011/0202598 A1 | 8/2011 | Evans et al. |
| 2011/0213845 A1 | 9/2011 | Logan et al. |
| 2011/0239136 A1 | 9/2011 | Goldman et al. |
| 2011/0286586 A1 | 11/2011 | Saylor et al. |
| 2011/0296324 A1 | 12/2011 | Goossens et al. |
| 2011/0320373 A1 | 12/2011 | Lee et al. |
| 2012/0005209 A1 | 1/2012 | Rinearson et al. |
| 2012/0028659 A1 | 2/2012 | Whitney et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0103760 A1 | 4/2013 | Golding et al. |
| 2013/0194301 A1 | 8/2013 | Robbins et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0290443 A1 | 10/2013 | Collins et al. |
| 2014/0032682 A1 | 1/2014 | Prado et al. |
| 2014/0043329 A1 | 2/2014 | Wang et al. |
| 2014/0055554 A1 | 2/2014 | Du et al. |
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0160149 A1 | 6/2014 | Blackstock et al. |
| 2014/0173430 A1 | 6/2014 | Clavel et al. |
| 2014/0201527 A1 | 7/2014 | Krivorot |
| 2014/0228055 A1* | 8/2014 | Karaoguz ............... H04W 4/02 455/456.3 |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0206349 A1 | 7/2015 | Rosenthal et al. |
| 2015/0227602 A1 | 8/2015 | Ramu et al. |

(56) References Cited

U.S. PATENT DOCUMENTS

| | | |
|---|---|---|
| 2016/0042224 A1 | 2/2016 | Liu et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0134840 A1 | 5/2016 | Mcculloch |
| 2016/0179967 A1 | 6/2016 | Sa et al. |
| 2016/0180887 A1 | 6/2016 | Sehn |
| 2016/0234149 A1 | 8/2016 | Tsuda et al. |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0161382 A1 | 6/2017 | Ouimet et al. |
| 2017/0193280 A1 | 7/2017 | Huang et al. |
| 2017/0199855 A1 | 7/2017 | Fishbeck |
| 2017/0235848 A1 | 8/2017 | Van Deusen et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0308290 A1 | 10/2017 | Patel |
| 2017/0310934 A1 | 10/2017 | Du et al. |
| 2017/0312634 A1 | 11/2017 | Ledoux et al. |
| 2017/0353416 A1 | 12/2017 | Brooks et al. |
| 2017/0372056 A1 | 12/2017 | Narasimhan |
| 2017/0374003 A1 | 12/2017 | Allen et al. |
| 2017/0374508 A1 | 12/2017 | Davis et al. |
| 2018/0018079 A1 | 1/2018 | Monastyrshyn et al. |
| 2018/0025004 A1 | 1/2018 | Koenig |
| 2018/0026925 A1* | 1/2018 | Kennedy .................. G06K 9/00 715/753 |
| 2018/0046518 A1 | 2/2018 | Shear et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0130459 A1 | 5/2018 | Paradiso et al. |
| 2018/0137383 A1 | 5/2018 | Yao et al. |
| 2018/0157399 A1 | 6/2018 | Cansino et al. |
| 2018/0188905 A1 | 7/2018 | Tran et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2020/0320767 A1 | 10/2020 | Al Majid et al. |
| 2021/0343061 A1* | 11/2021 | Al Majid .............. G06F 3/0304 |

FOREIGN PATENT DOCUMENTS

| | | |
|---|---|---|
| CN | 110168478 A | 8/2019 |
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012000107 A1 | 1/2012 |
| WO | WO-2012139276 A1 | 10/2012 |
| WO | WO-2013008251 A2 | 1/2013 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194262 A2 | 12/2014 |
| WO | WO-2014194439 A1 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016090605 A1 | 6/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"U.S. Appl. No. 15/908,422, Examiner Interview Summary dated Nov. 30, 2018", 4 pgs.

"U.S. Appl. No. 15/908,422, Final Office Action dated Mar. 14, 2019", 15 pgs.

"U.S. Appl. No. 15/908,422, Final Office Action dated Nov. 27, 2019", 17 pgs.

"U.S. Appl. No. 15/908,422, Non Final Office Action dated Jun. 20, 2019", 15 pgs.

"U.S. Appl. No. 15/908,422, Non Final Office Action dated Sep. 6, 2018", 13 pgs.

"U.S. Appl. No. 15/908,422, Notice of Allowance dated Mar. 23, 2020", 8 pgs.

"U.S. Appl. No. 15/908,422, Response filed Feb. 27, 2020 to Final Office Action dated Nov. 27, 2019", 10 pgs.

"U.S. Appl. No. 15/908,422, Response filed Nov. 28, 2018 to Non Final Office Action dated Sep. 6, 2018", 11 pgs.

"U.S. Appl. No. 15/908,422, Response filed May 9, 2019 to Final Office Action dated Mar. 14, 2019", 11 pgs.

"U.S. Appl. No. 15/908,422, Response filed Aug. 22, 2019 to Non-Final Office Action dated Jun. 20, 2019", 12 pgs.

"U.S. Appl. No. 16/946,463, Final Office Action dated Dec. 3, 2020", 15 pgs.

"U.S. Appl. No. 16/946,463, Non Final Office Action dated Feb. 19, 2021", 14 pgs.

"U.S. Appl. No. 16/946,463, Non Final Office Action dated Aug. 28, 2020", 12 pgs.

"U.S. Appl. No. 16/946,463, Notice of Allowance dated May 14, 2021", 8 pgs.

"U.S. Appl. No. 16/946,463, Response filed Feb. 3, 2021 to Final Office Action dated Dec. 3, 2020", 9 pgs.

"U.S. Appl. No. 16/946,463, Response filed Apr. 28, 2021 to Non Final Office Action dated Feb. 19, 2021", 10 pgs.

"U.S. Appl. No. 16/946,463, Response filed Sep. 1, 2020 to Non Final Office Action dated Aug. 28, 2020", 12 pgs.

"U.S. Appl. No. 17/376,457, Non Final Office Action dated Mar. 1, 2022", 13 pgs.

"U.S. Appl. No. 17/376,457, Notice of Allowance dated May 16, 2022", 8 pgs.

"U.S. Appl. No. 17/376,457, Response filed Apr. 28, 2022 to Non Final Office Action dated Mar. 1, 2022", 10 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

(56) References Cited

OTHER PUBLICATIONS

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

U.S. Appl. No. 15/908,422 U.S. Pat. No. 10,726,603, filed Feb. 28, 2018, Animated Expressive Icon.

U.S. Appl. No. 16/946,463 U.S. Pat. No. 11,120,601, filed Jun. 23, 2020, Animated Expressive Icon.

U.S. Appl. No. 17/376,457, filed Jul. 15, 2021, Animated Expressive Icon.

* cited by examiner

ANIMATED EXPRESSIVE ICON

CLAIM OF PRIORITY

This application is a continuation of U.S. patent application Ser. No. 17/376,457, filed Jul. 15, 2021, which application is a continuation of U.S. patent application Ser. No. 16/946,463, filed on Jun. 23, 2020, now issued as U.S. Pat. No. 11,120,601, which is a continuation of U.S. patent application Ser. No. 15/908,422, filed on Feb. 28, 2018, now issued as U.S. Pat. No. 10,726,603, which are incorporated herein by reference in its entireties.

TECHNICAL FIELD

Embodiments of the present disclosure relate generally to mobile computing technology and, more particularly, but not by way of limitation, to systems for presenting an animated expressive graphical icon.

BACKGROUND

Research has shown that facial tracking and performance capturing technology have had significant impacts in a broad range of fields that include computer gaming, animations, entertainment, human-computer interface. For example, some of the research has shown that users interacting with a digital avatar, such as an animated face, are 30% more trustworthy than compared with the same interactions with text-only scripts.

Increased prevalence of mobile devices has resulted in "social networking" to become an important part in the day-to-day activities of many people's lives. Today, hundreds of millions of people use their virtual identities to communicate and interact with other people over the web, internet and the like via Social networking sites. In addition, these virtual identities are used to play games over the web, internet and the like.

While social networking provides the ability for contact between people any time of day or night, it is often difficult to ascertain exactly how people are feeling by looking at their virtual identity, or through reading text messages alone.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
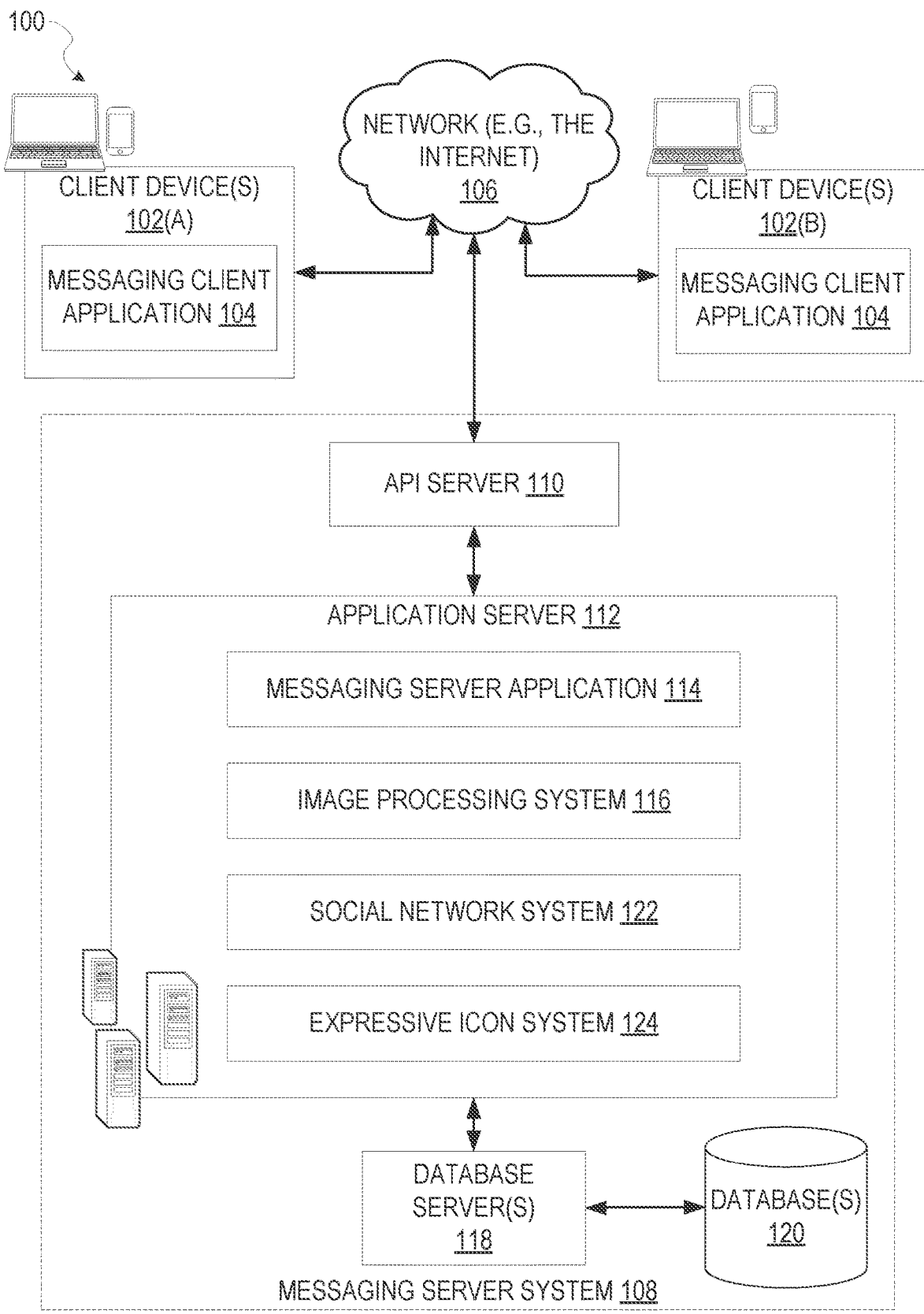
FIG. 1 is a block diagram showing an example messaging system for exchanging data (e.g., messages and associated content) over a network in accordance with some embodiments, wherein the messaging system includes a chat presence system.

Embodiments described herein relate to an expressive icon system (hereinafter referred to as the system) to present an animated graphical icon, wherein the animated graphical icon is generated by capture facial tracking data at a client device. In some embodiments, the system may track and capture facial tracking data of a user via a camera associated with a client device (e.g., a front facing camera, or a paired camera), and process the facial tracking data to animate a graphical icon. In further embodiments, the system facilitates the distribution and sharing of the animated graphical icon, for example by attaching the animated graphical icon to a message to be distributed to a plurality of users, such that the animated graphical icon tracks the facial tracking data of the user in real-time, or by publishing the animated graphical icon at a location accessible through a network (e.g., a user profile picture of a user).

In some example embodiments, the system captures facial tracking data and audio data in real time at a first client device, and generates and presents the audio and an animated graphical icon based on the real-time facial tracking data, at a second client device. For example, a user of the first client device may request an initiation of a communication session with a user of a second client device. In response to receiving an authorization to initiate the communication session, the first client device captures facial tracking data of the user via a camera associated with the client device (e.g., a front facing camera of a client device), and causes a presentation of an animated graphical icon in real-time based on the facial tracking data at the second client device.

In some example embodiments, the system generates an expressive animated icon at the first client device based on the facial tracking data, renders a flattened animation of the expressive animated icon at the first client device, and causes display of the flattened animation of the expressive animated icon to the second client device. In such embodiments, the generation and rendering of the expressive animated icon occurs separate from the recipient device (e.g., the second client device), similar to a thin client.

In further embodiments, the system captures the facial tracking data at a first client device, in real-time, and transmits the real-time facial tracking data to a second client device, where the facial tracking data is transposed onto a graphical icon. In this way, the second client device may generate and display an animated graphical icon based on received facial tracking data.

In some example embodiments, a user provides a selection of the graphical icon to be animated by the system. For example, the system may display a set of graphical icons at a client device, and receive a selection of the graphical icon from among the set of graphical icons. The system receives facial tracking data and transposes the facial tracking data upon the selected graphical icon in real-time.

A user may select and associate a graphical icon with a user profile, such that facial tracking data received from a device associated with the user profile are transposed to the selected graphical icon. In further embodiments, a user may select or change the graphical icon in real-time, and in response the system transposes the facial tracking data to the selected graphical icon, and causes display of the selected graphical icon at the client device.

In some example embodiments, facial tracking is performed by the system through the identification of various 2D and 3D facial landmarks correspond to semantic facial features of a human face, such as the contour of eyes, lips and eyebrows, the tip of a nose, etc. The system transposes the tracked facial landmarks onto a graphical icon, resulting in an expressive icon that depicts the shape of the user's different expressions in real-time.

Consider an illustrative example from a user perspective. A first user of a first client device may initiate a communication session with a second user of a second client device. In response to initiating the communication session between the first client device and the second client device, the first client device captures facial tracking data from the first user, via a front facing camera.

The system generates and causes display of a presentation of an animated expressive icon at the second client device, wherein the animated expressive icon is animated based on the facial tracking data captured at the first client device, in real-time. In some embodiments, as discussed herein, the system may generate a flattened video of the animated expressive icon based on the facial tracking data at the first client device, and transmit the flattened video of the animated expressive icon to the second client device, where it is presented to the second user. In further embodiments, the system captures the facial tracking data at the first client device, transmits the facial tracking data to the second client device in real-time, and the second client device animates the animated expressive icon in real-time, based on the facial tracking data captured at the first client device. In this way, users may communicate with one another via presentations of animated expressive icons.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an expressive icon system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
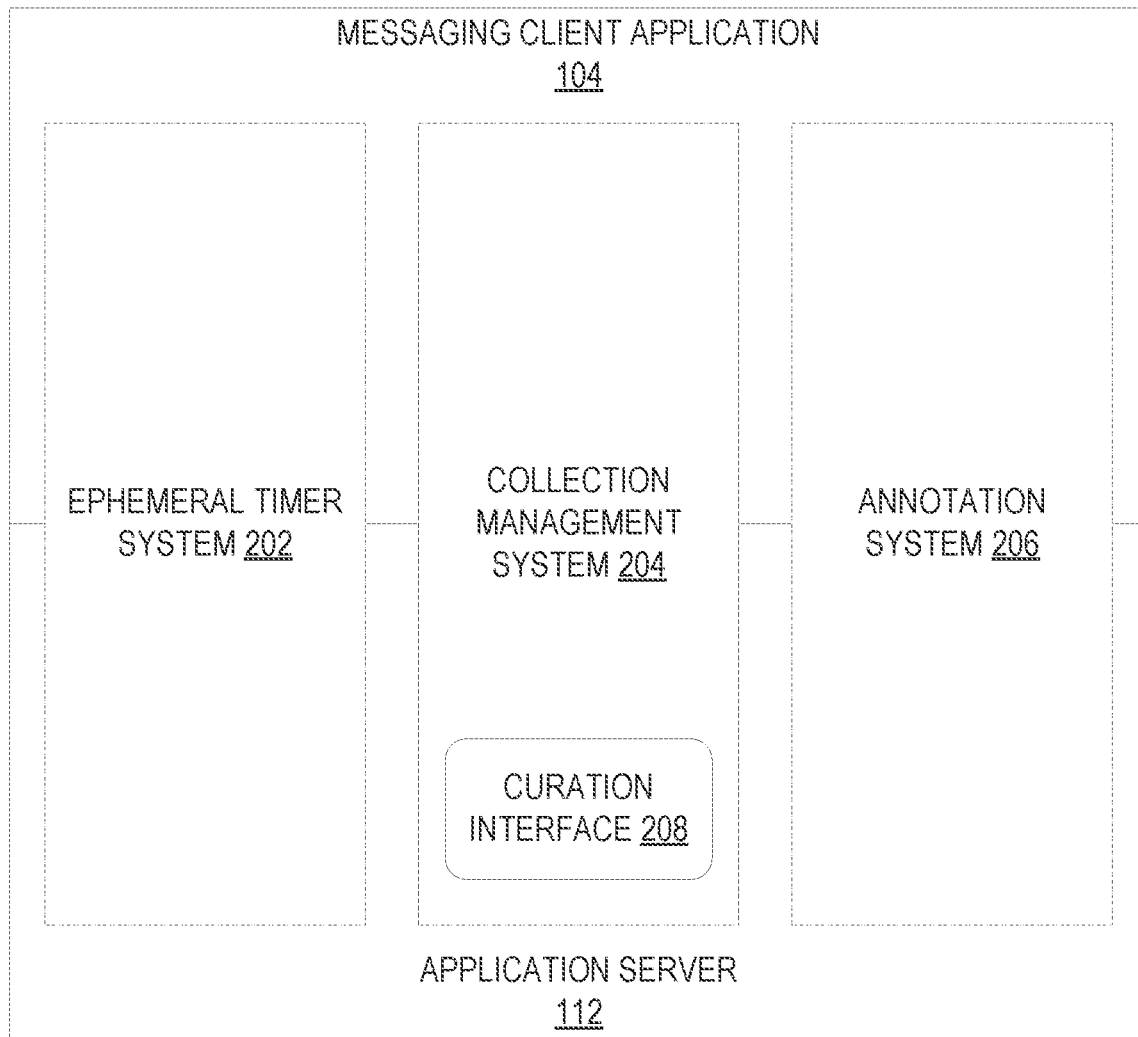
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models, such as those generated by the expressive icon system 124. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
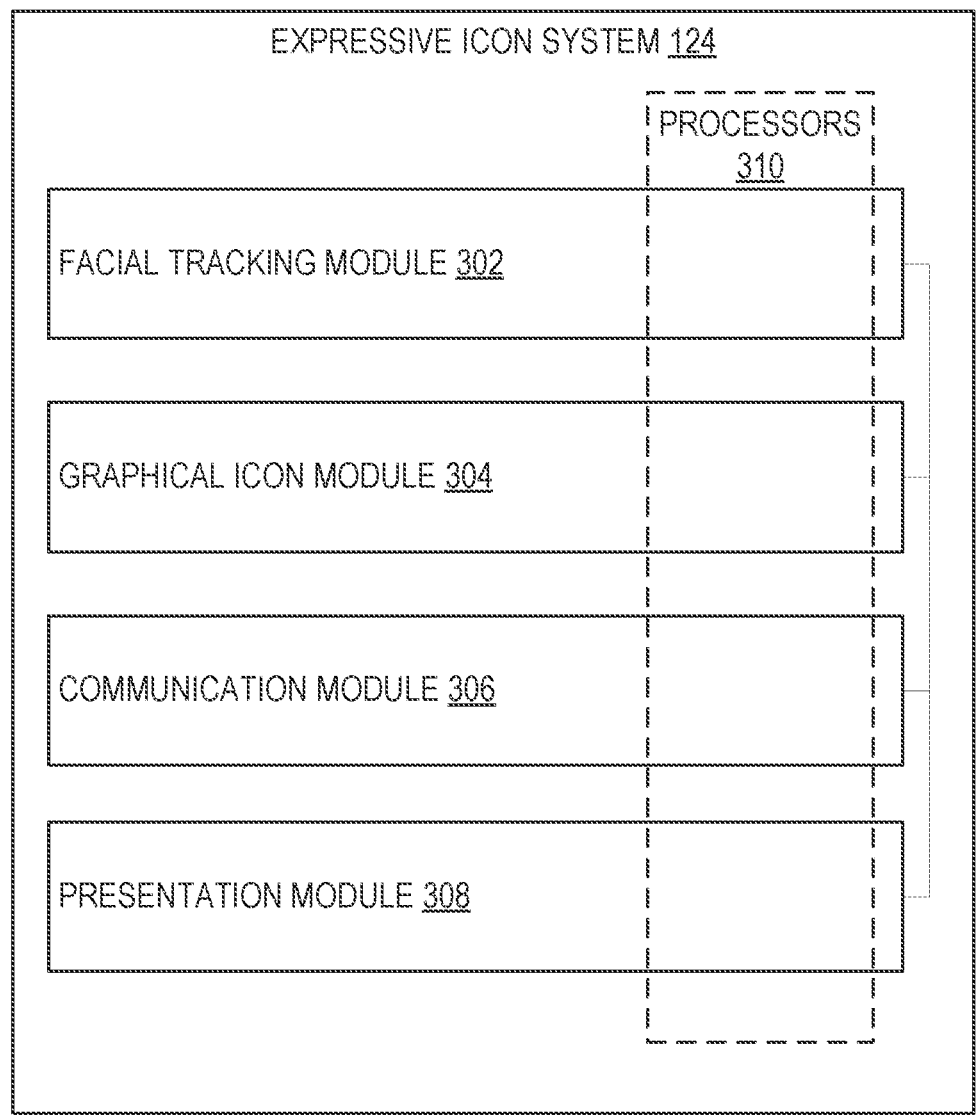
FIG. 3 is a block diagram illustrating various modules of an expressive icon system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the expressive icon system 124 that configure the expressive icon system 124 to capture facial tracking data, assign the facial tracking data to a graphical icon (e.g., a bitmoji, an animated expressive icon), and present the graphical icon based on the facial tracking data, according to some example embodiments. The expressive icon system 124 is shown as including a facial tracking module 302, a graphical icon module 304, a communication module 306, and presentation module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the expressive icon system 124 may physically include an arrangement of one or more of the processors 310 (e.g., a subset of or among the one or more processors of the machine) configured to perform the operations described herein for that module. As another example, any module of the expressive icon system 124 may include software, hardware, or both, that configure an arrangement of one or more processors 310 (e.g., among the one or more processors of the machine) to perform the operations described herein for that module. Accordingly, different modules of the expressive icon system 124 may include and configure different arrangements of such processors 310 or a single arrangement of such processors 310 at different points in time. Moreover, any two or more modules of the expressive icon system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
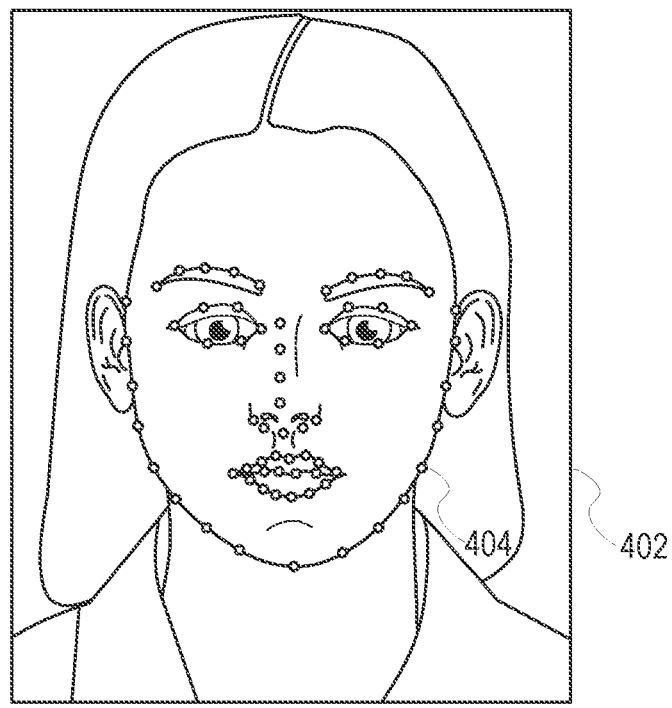
FIG. 4 is a depiction of facial tracking data captured by and expressive icon system, according to certain example embodiments.
Figure 4:
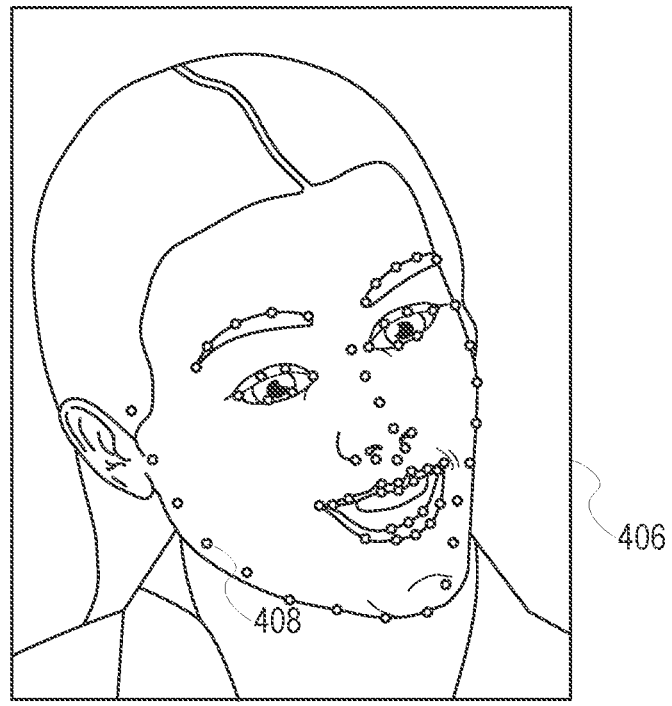

FIG. 4 is a depiction of facial tracking data captured by the facial tracking module 302 of the expressive icon system 124, according to certain example embodiments. In some example embodiments, as seen in FIG. 4, the tracked facial landmarks 404 and 408 comprises a set of points, wherein each point corresponds to a facial landmark identified by the expressive icon system 124, based on image or video data (e.g., image or video data 402, 406).

In some embodiments, the expressive icon system 124 receives video data 404 and 406 in real-time via front facing camera of a client device 102, and tracks the facial tracking data that includes facial landmarks 404 and 408, wherein the facial landmarks 502 and 508 correspond to the semantic facial features of a human face, such as the contour of eyes, lips, nose, and eyebrows.

Figure 5:
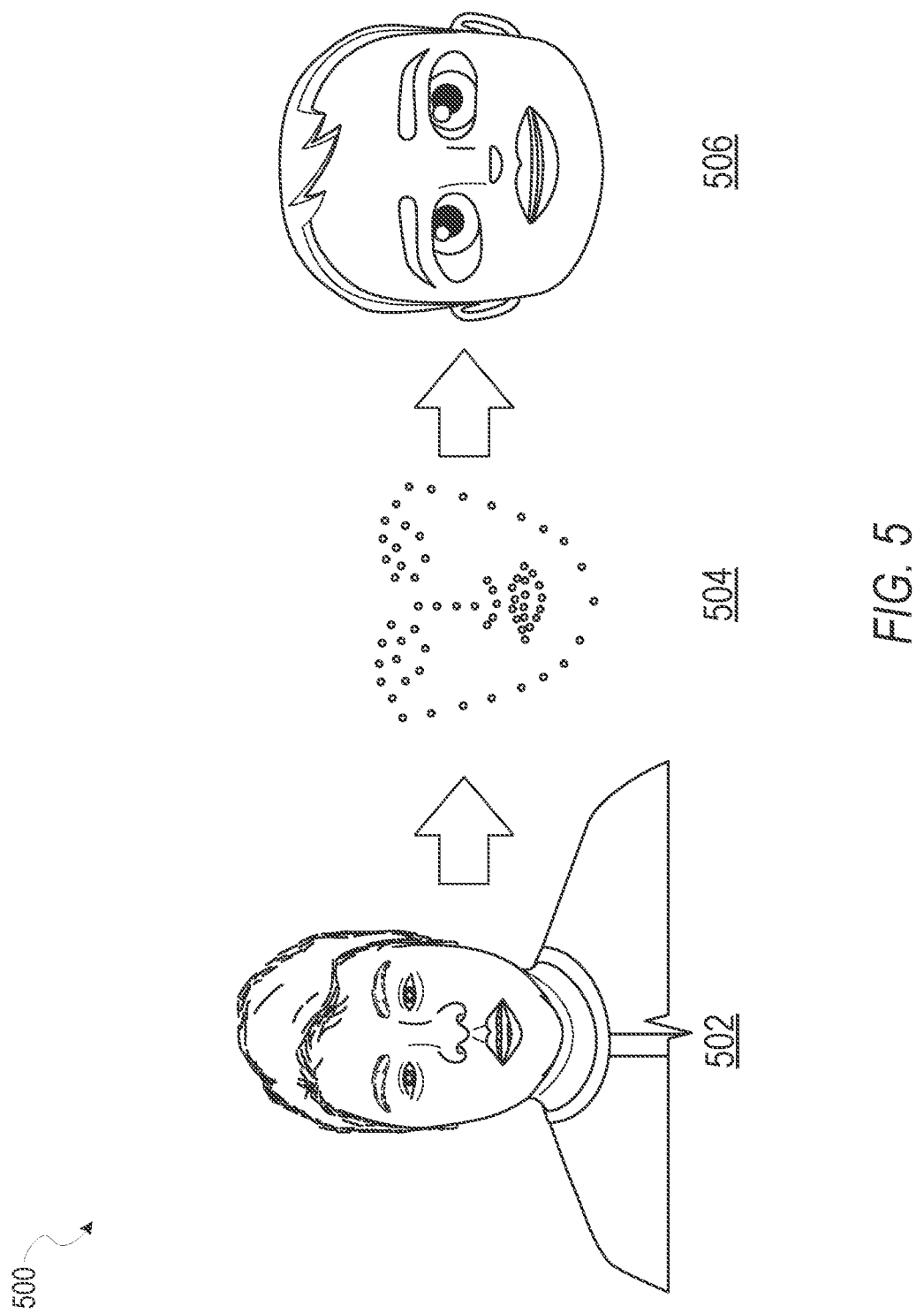
FIG. 5 is a flow diagram illustrating operations performed by an expressive icon system, in receiving video data in real-time, tracking facial landmarks from the video data, and generating and display an animated expressive graphical icon based on the tracked facial landmarks, according to certain example embodiments.

FIG. 5 is a flow diagram 500 illustrating operations performed by the expressive icon system 124, in receiving video data in real-time, tracking facial landmarks from the video data, and generating and display an animated expressive graphical icon based on the tracked facial landmarks, according to certain example embodiments.

At operation 502, the facial tracking module 302 receives image or video data that includes a depiction of a face. For example, the facial tracking module 302 may access a front facing camera of a client device 102, and capture video data depicting a user of the client device 102.

At operation 504, the facial tracking module 302 captures facial tracking data in real-time, wherein the facial tracking data includes a set of points that identify facial landmarks, as described in FIG. 4.

At operation 506, the graphical icon module 306 generates and causes display of an expressive animated icon based on the facial tracking data, in real-time. The animated graphical icon therefore depicts a real-time expression of the user, based on the real-time facial tracking data collected by the facial tracking module 302.

Figure 6:
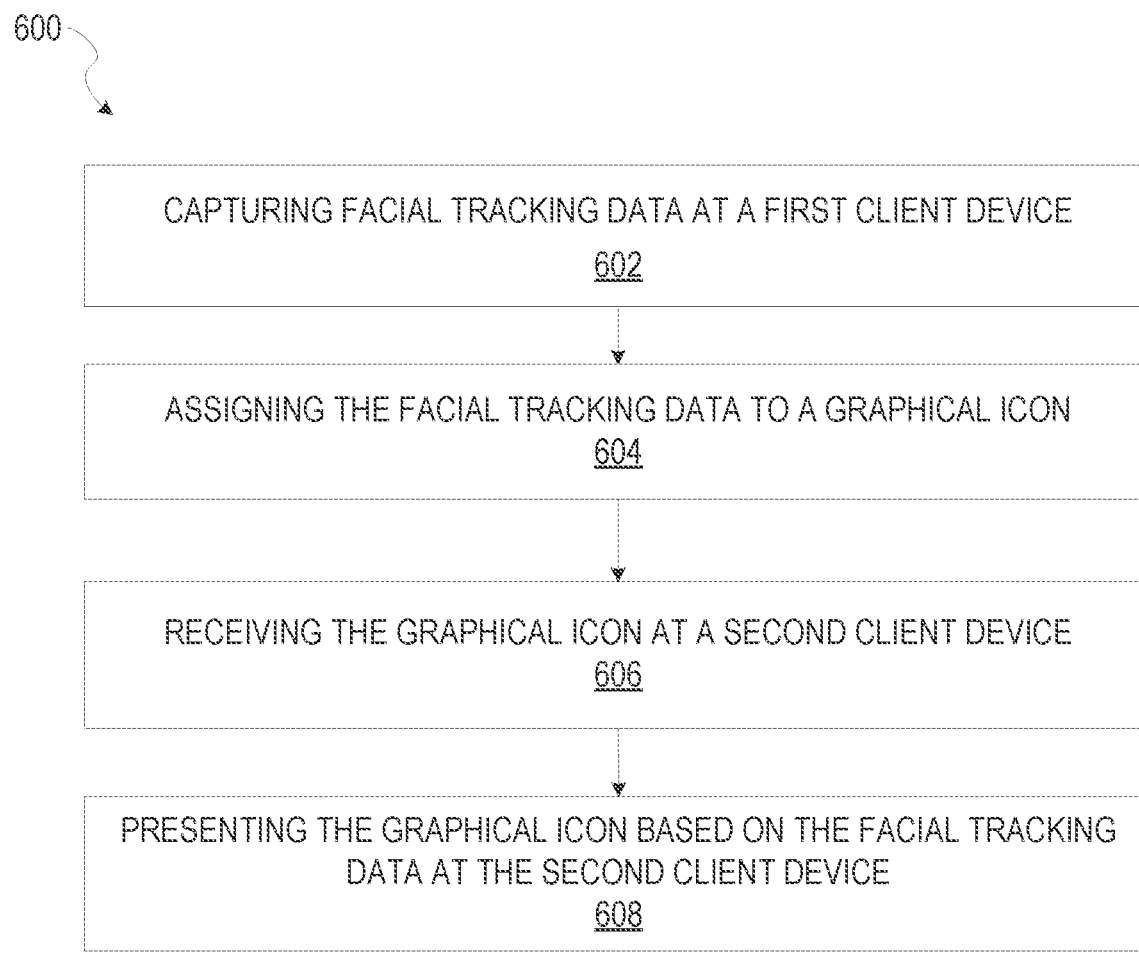
FIG. 6 depicts a method for presenting an expressive animated graphical icon based on real-time facial tracking data, according to certain example embodiments.

FIG. 6 depicts a method 600 for presenting an expressive animated graphical icon based on real-time facial tracking data, according to certain example embodiments. Operations of the method 600 may be performed by the modules described above with respect to FIG. 3. As shown in FIG. 6, the method 600 includes one or more operations 602, 604, 606, and 608.

At operation 602, the facial tracking module 302 captures facial tracking data (e.g., real-time facial tracking data 504 of FIG. 5, facial tracking data 404 of FIG. 4) at a first client device (e.g., client device 102A of FIG. 1). For example, the client device 102A may include a front facing camera. In response to receiving an initiation of a communication session between a first user of the first client device 102A, and a second user of a second client device 102B, the facial tracking module 302 activates a front facing camera of the client device 102A, to capture real-time video data that includes video and images depicting the first user. The facial tracking module 302 extracts the facial tracking data from the videos or images by performing one or more facial landmark identification methods. For example, the facial tracking module 302 captures facial tracking data by identifying one or more facial landmarks of the first user in the video data received through the front facing camera, as seen in FIG. 4 and FIG. 5.

At operation 604, the graphical icon module 304 assigns the facial tracking data to a graphical icon. In some embodiments, the first user may select or define a graphical icon to transpose the facial tracking data upon, within a user profile associated with the first user. The first user may predefine selections of graphical icons based on one or more context conditions, such that the graphical icon module 304 selects an appropriate graphical icon based on the detection of certain context conditions. The context conditions may include a location, an identity of a recipient of the graphical icon, a time of day, a current season, identification of a holiday or event.

In some example embodiments, the graphical icon module 304 may select a graphical icon from among a set of graphical icons based on a destination of the graphical icon. For example, the graphical icon module 304 may retrieve user profile information of a user (e.g., the second user) associated with the second client device 102B, in response to the initiation of the communication session. The first user may predefine a specific graphical icon (e.g., a bitmoji) to be used in communication sessions with the second user. The graphical icon module 304 may select the graphical icon based on an identifier associated with the second user (e.g., phone number, user identifier, facial tracking data of the second user).

In some example embodiments, the graphical icon module 304 may select a graphical icon from among a set of graphical icons based on a current location of the first client device. For example, the graphical icon module 304 may retrieve location data that identified a current location of the first client device 102A or 102B, in response to the initiation of the communication session. An administrator or the first user may predefine a specific graphical icon (e.g., a bitmoji) to be used in communication sessions wherein one or more client devices associated with the communication session are located at a predefined location, or within a geo-fenced area. The graphical icon module 304 may select the graphical icon based on an identifier associated with a location of the first client device 102 or the second client device 102B (e.g., GPS coordinates, presence within a geo-fence).

In some example embodiments, the graphical icon module 304 may select a graphical icon from among a set of graphical icons based on a current temporal period (e.g., time, day, season) of the communication session. For example, the graphical icon module 304 may receive an identification of a temporal period, in response to the initiation of the communication session. An administrator or the first user may predefine one or more graphical icons for specific temporal periods (e.g., time, date, national holiday, birthday, local holiday, local event/concert, spring, winter). The graphical icon module 304 may select the graphical icon based on the identification of the current temporal period.

In further embodiments, the graphical icon may selected or changed based on an input from the first user or the second user. For example, the first user or the second user may select the graphical icon from among a set of graphical icons, and in response, the graphical icon module 304 transposes the facial tracking data to the selected graphical icon.

At operation 606, the communication module 306 delivers the graphical icon to the second client device 102B, from the first client device 102A. In some embodiments, the communication module 306 may deliver a message that contains an identification of the graphical icon, and the facial tracking data to the second client device 102B. The second client device 102B generates an expressive animated icon based on the tracking data and the selection of the graphical icon, and displays the expressive animated icon at the second client device 102B at operation 608.

In further embodiments, the graphical icon module 304 generates a real-time video at the first client device 102A, based on the facial tracking data and the selection of the graphical icon. The communication module 306 may flatten the real-time video at the first client device 102A, and deliver the flattened video to the second client device 102B. At operation 608, the communication module present the flattened video at the second client device 102B.

Figure 7:
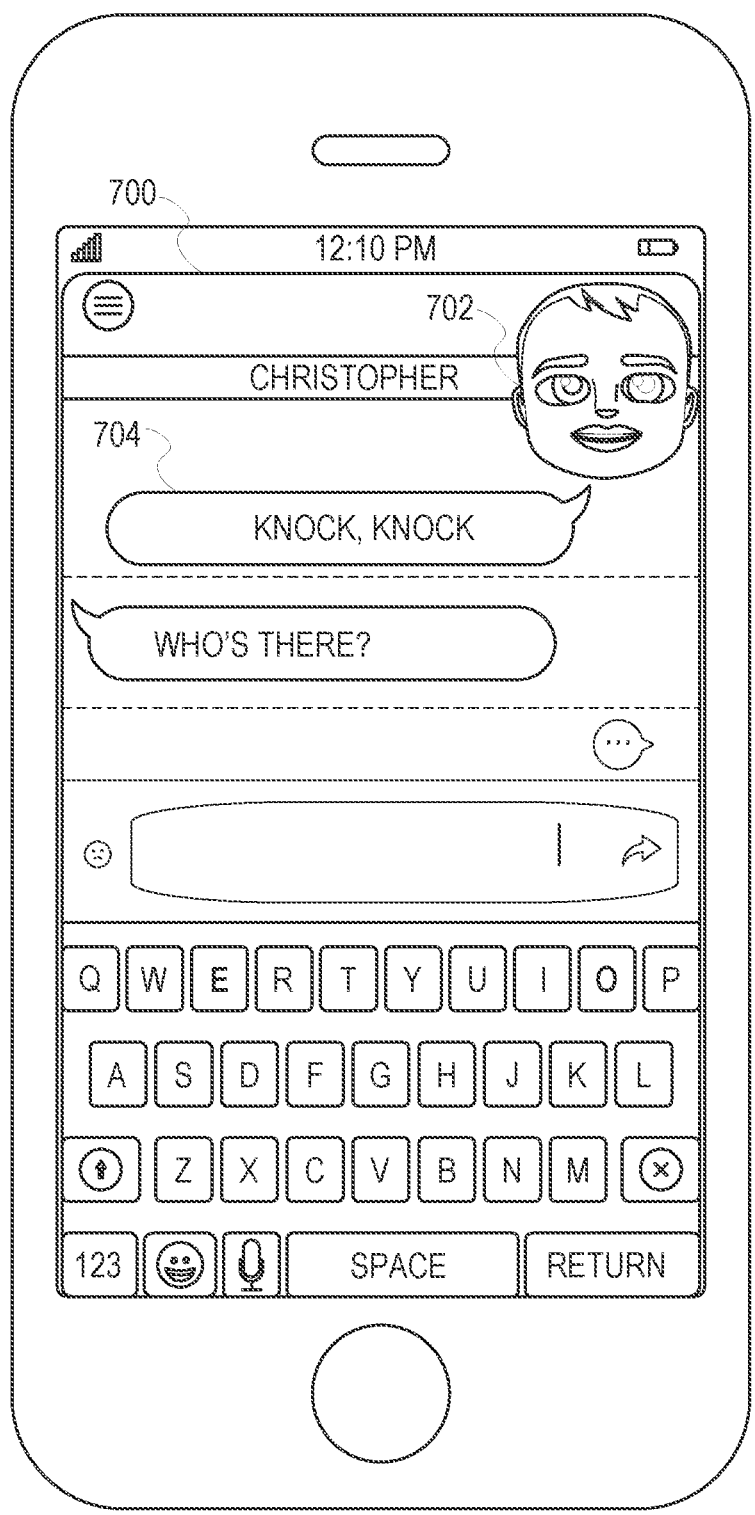
FIG. 7 is an interface diagram illustrating an interface to display an expressive animated icon, according to certain example embodiments.

FIG. 7 is an interface diagram illustrating an interface 700 to display an expressive animated icon 702, according to certain example embodiments. As seen in FIG. 7, the interface 700 may display a message 704 of a communication session (e.g., between a first client device 102A and a second client device 102B). In some embodiments, the animated expressive icon 702 may be displayed within a portion of the interface 700, and in conjunction with a message (e.g., the message 704) of a communication session. In further embodiments, the message 704 may include an ephemeral message, as discussed and illustrated above in FIGS. 2 and 3.

As discussed herein, the expressive animated icon 704 may emote in real-time, based on facial tracking data collected by the expressive icon system 124. In further embodiments, the expressive animated icon 704 may be created by a user (e.g., the first user), and assigned to a home page or user profile page associated with the user, such that accessing and displaying the home page or user profile page causes the expressive icon system 124 to retrieve a sequence of facial tracking data, and transpose the sequence of facial tracking data onto a graphical icon to be presented at a client device. For example, the expressive animated icon 704 may be used as an avatar associated with the user, wherein the avatar is animated based on the sequence of facial tracking data.

Software Architecture

Figure 8:
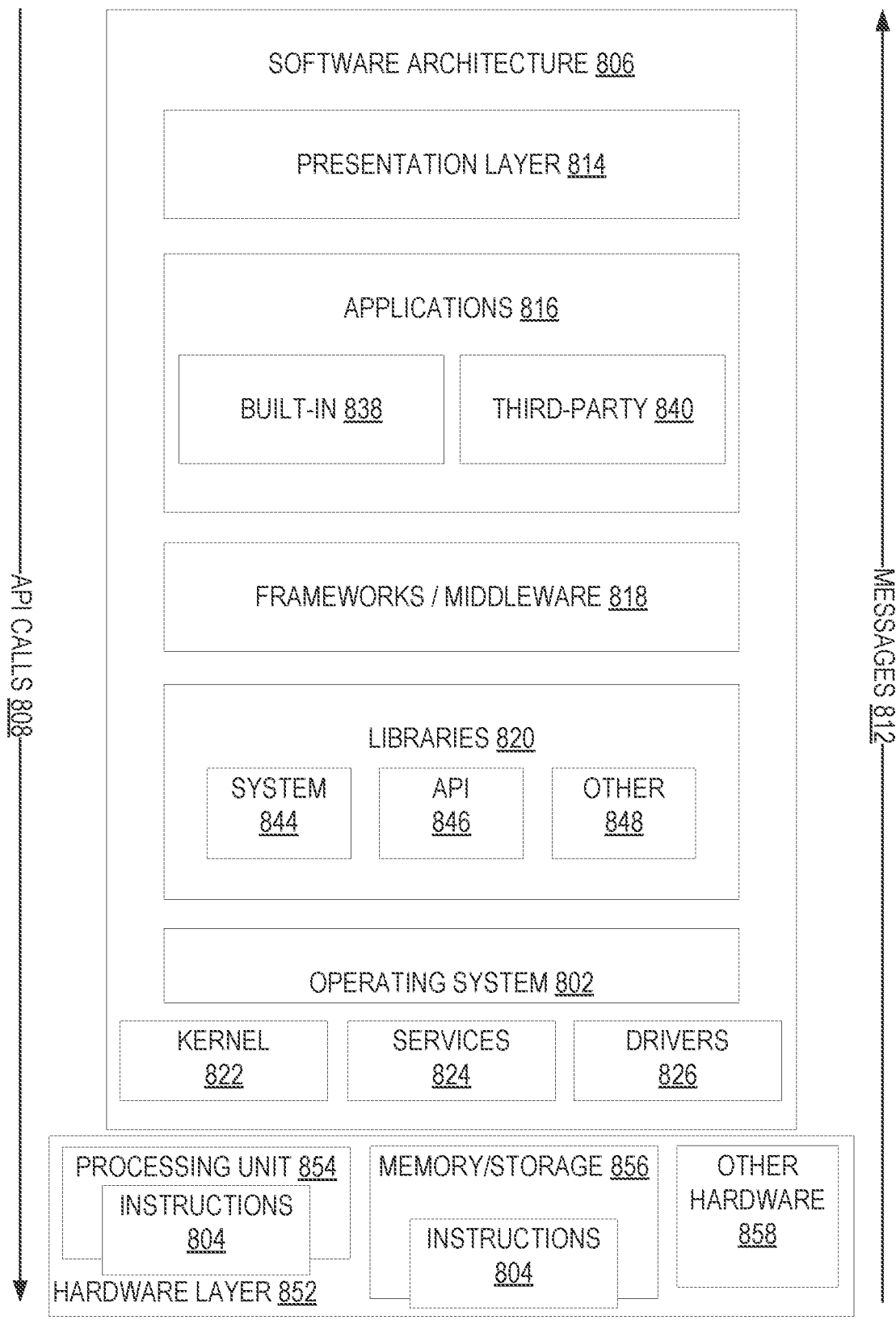
FIG. 8 is a block diagram illustrating a representative software architecture, which may be used in conjunction with various hardware architectures herein described and used to implement various embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and I/O components 918. A representative hardware layer 852 is illustrated and can represent, for example, the machine 800 of FIG. 8. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, applications 816 and a presentation layer 814. Operationally, the applications 816 and/or other components within the layers may invoke application programming interface (API) API calls 808 through the software stack and receive a response as in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers. The applications 816 may include applications related to and including the expressive icon system 124.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems interactions with a user may occur through a presentation layer, such as presentation layer 814. In these systems, the application/component "logic" can be separated from the aspects of the application/component that interact with a user.

Figure 9:
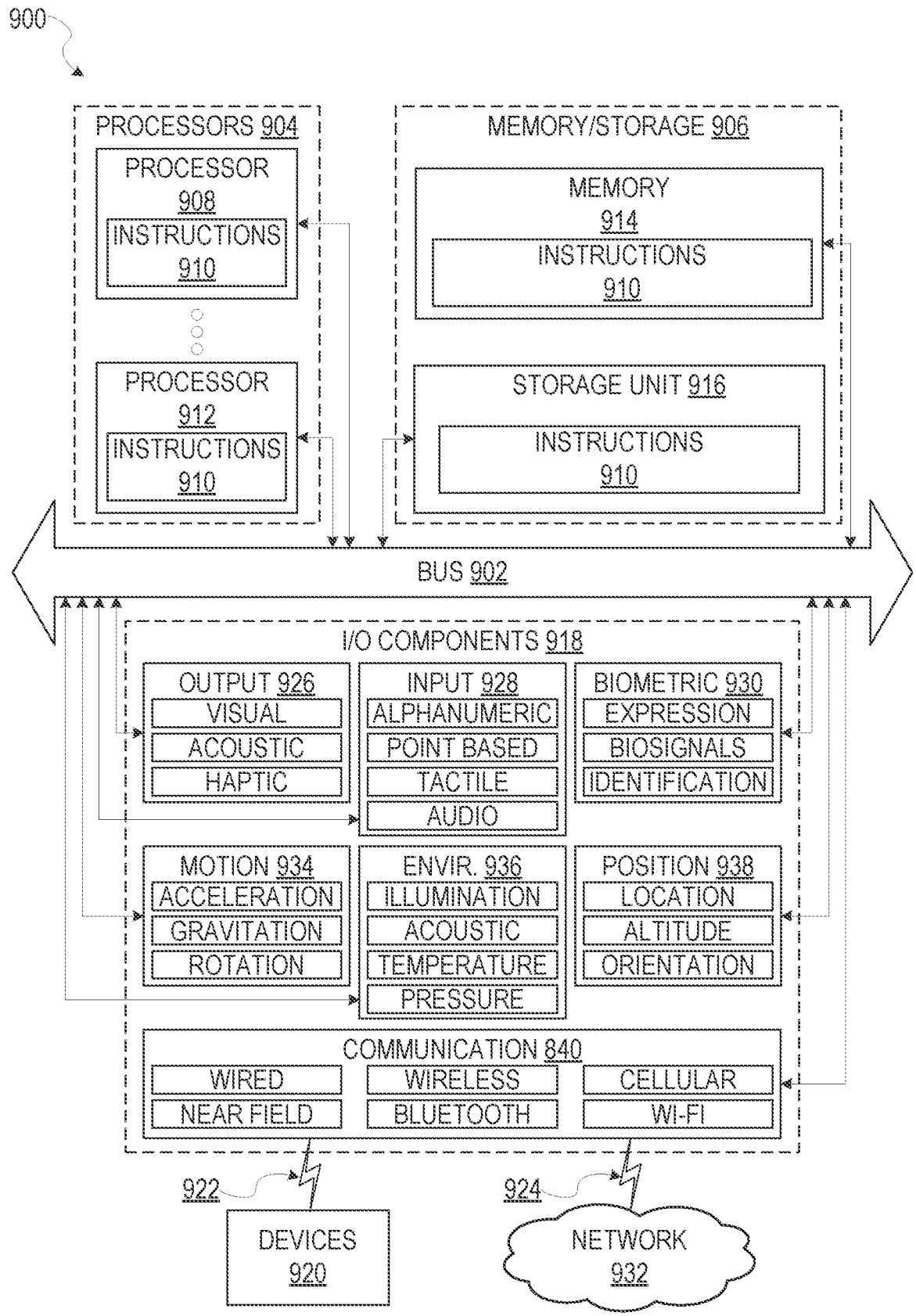
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
   receiving, from a client device, a request to initiate a communication session with a user associated with a user account;
   initiating the communication session with the user associated with the user account at the client device;
   associating, at the client device, a graphical icon with the user account;
   causing display of a presentation of the graphical icon at the client device responsive to the initiating the communication session with the user associated with the user account;
   receiving facial tracking data associated with the user of the user account; and
   animating the presentation of the graphical icon at the client device based on the facial tracking data.

2. The method of claim 1, wherein the receiving the facial tracking data further comprises:
   receiving image data that comprises a depiction of a set of facial landmarks;
   generating a set of points based on positions of the set of facial landmarks, each point among the set of points corresponding to a facial landmark from among the set of facial landmarks; and
   generating the facial tracking data based on the set of points.

3. The method of claim 1, wherein the causing display of the presentation of the graphical icon further comprises:
   associating the graphical icon to one or more contextual factors; and
   selecting the graphical icon based on the one or more contextual factors.

4. The method of claim 3, wherein the contextual factors include one or more of:
   attributes of the client device;
   location data; and
   a time of day.

5. The method of claim 1, wherein the animating the presentation of the graphical icon based on the facial tracking data comprises:
   transposing the facial tracking data upon the graphical icon.

6. The method of claim 1, wherein the method further comprises:
   generating a message that includes the presentation of the graphical icon.

7. The method of claim 6, wherein the message includes an ephemeral message.

8. A system comprising:
   a memory; and
   at least one hardware processor coupled to the memory and comprising instructions that causes the system to perform operations comprising:
   receiving, from a client device, a request to initiate a communication session with a user associated with a user account;
   initiating the communication session with the user associated with the user account at the client device;
   associating, at the client device, a graphical icon with the user account;
   causing display of a presentation of the graphical icon at the client device responsive to the initiating the communication session with the user associated with the user account;
   receiving facial tracking data associated with the user of the user account; and
   animating the presentation of the graphical icon at the client device based on the facial tracking data.

9. The system of claim 8, wherein the receiving the facial tracking data further comprises:
   receiving image data that comprises a depiction of a set of facial landmarks;
   generating a set of points based on positions of the set of facial landmarks, each point among the set of points corresponding to a facial landmark from among the set of facial landmarks; and
   generating the facial tracking data based on the set of points.

10. The system of claim 8, wherein the causing display of the presentation of the graphical icon further comprises:
    associating the graphical icon to one or more contextual factors; and
    selecting the graphical icon based on the one or more contextual factors.

11. The system of claim 10, wherein the contextual factors include one or more of:
    attributes of the client device;
    location data; and
    a time of day.

12. The system of claim 8, wherein the animating the presentation of the graphical icon based on the facial tracking data comprises:

trasposing the facial tracking data upon the graphical icon.

13. The system of claim 8, further comprising:

generating a message that includes the presentation of the graphical icon.

14. The system of claim 13, wherein the message includes an ephemeral message.

15. A non-transitory machine-readable storage medium comprising instructions that, when executed by one or more processors of a machine, cause the machine to perform operations comprising:

receiving, from a client device, a request to initiate a communication session with a user associated with a user account;

initiating the communication session with the user associated with the user account at the client device;

associating, at the client device, a graphical icon with the user account;

causing display of a presentation of the graphical icon at the client device responsive to the initiating the communication session with the user associated with the user account;

receiving facial tracking data associated with the user of the user account; and animating the presentation of the graphical icon at the client device based on the facial tracking data.

16. The non-transitory machine-readable storage medium of claim 15, wherein the receiving the facial tracking data further comprises:

receiving image data that comprises a depiction of a set of facial landmarks;

generating a set of points based on positions of the set of facial landmarks, each point among the set of points corresponding to a facial landmark from among the set of facial landmarks; and generating the facial tracking data based on the set of points.

17. The non-transitory machine-readable storage medium of claim 15, wherein the causing display of the presentation of the graphical icon further comprises:

associating the graphical icon to one or more contextual factors; and selecting the graphical icon based on the one or more contextual factors.

\* \* \* \* \*